United States Patent
Georgin et al.

(10) Patent No.: US 8,965,657 B2
(45) Date of Patent: Feb. 24, 2015

(54) SYSTEM AND METHOD FOR DETECTING AN ON GROUND CONDITION OF AN AIRCRAFT

(71) Applicant: Goodrich Corporation, Charlotte, NC (US)

(72) Inventors: Marc Georgin, Dayton, OH (US); Richard Metzger, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 36 days.

(21) Appl. No.: 13/933,992

(22) Filed: Jul. 2, 2013

(65) Prior Publication Data

US 2015/0012195 A1 Jan. 8, 2015

(51) Int. Cl.
*B64C 25/42* (2006.01)
*B60T 8/171* (2006.01)

(52) U.S. Cl.
CPC . *B64C 25/42* (2013.01); *B60T 8/171* (2013.01)
USPC ............. 701/79; 303/126; 244/111; 701/3; 701/16; 701/75; 701/78

(58) Field of Classification Search
None
See application file for complete search history.

(56) References Cited

U.S. PATENT DOCUMENTS

| | | | | |
|---|---|---|---|---|
| 3,880,475 A * | 4/1975 | Booher | | 303/195 |
| 4,269,455 A * | 5/1981 | Beck et al. | | 303/126 |
| 5,050,940 A * | 9/1991 | Bedford et al. | | 303/166 |
| 5,707,118 A * | 1/1998 | Kolberg et al. | | 303/126 |
| 5,806,794 A * | 9/1998 | Hrusch et al. | | 244/111 |
| 6,142,585 A * | 11/2000 | Gowan et al. | | 303/126 |
| 6,241,325 B1 * | 6/2001 | Gowan et al. | | 303/176 |
| 6,390,571 B1 * | 5/2002 | Murphy | | 303/126 |
| 6,672,688 B2 * | 1/2004 | Gale et al. | | 303/126 |
| 6,851,649 B1 * | 2/2005 | Radford | | 244/111 |
| 7,837,279 B2 * | 11/2010 | Salamat et al. | | 303/112 |
| 7,938,494 B2 * | 5/2011 | Ribbens et al. | | 303/112 |
| 8,083,295 B2 * | 12/2011 | Raby et al. | | 303/126 |
| 8,229,641 B2 * | 7/2012 | Clothier | | 701/90 |
| 8,538,654 B2 * | 9/2013 | Cahill | | 701/72 |
| 2003/0111895 A1 * | 6/2003 | Salamat et al. | | 303/9.61 |
| 2005/0040286 A1 * | 2/2005 | Radford | | 244/111 |
| 2007/0222285 A1 * | 9/2007 | Ribbens et al. | | 303/139 |
| 2008/0001471 A1 * | 1/2008 | Rudd | | 303/3 |
| 2008/0221768 A1 * | 9/2008 | Salamat et al. | | 701/74 |
| 2010/0109429 A1 * | 5/2010 | Griffith | | 303/121 |
| 2010/0274457 A1 * | 10/2010 | Cahill | | 701/70 |
| 2011/0278915 A1 * | 11/2011 | DeVlieg et al. | | 303/126 |
| 2012/0153075 A1 * | 6/2012 | Wilson et al. | | 244/50 |
| 2012/0259500 A1 * | 10/2012 | DeVlieg | | 701/29.4 |
| 2013/0175403 A1 * | 7/2013 | Spray | | 244/235 |
| 2013/0267375 A1 * | 10/2013 | Tadayon et al. | | 475/337 |
| 2013/0325221 A1 * | 12/2013 | Shue | | 701/16 |
| 2014/0018978 A1 * | 1/2014 | Cahill et al. | | 701/3 |
| 2014/0100719 A1 * | 4/2014 | Thibault | | 701/3 |

* cited by examiner

Primary Examiner — Thomas Tarcza
Assistant Examiner — Richard Goldman
(74) Attorney, Agent, or Firm — Snell & Wilmer LLP

(57) ABSTRACT

Systems and methods for detecting an on ground condition of an aircraft are disclosed. A weight on wheel system may determine that an aircraft is on the ground. Wheel speed sensors may measure the speed of the aircraft wheels. Axle reference speeds may be calculated for each landing gear based on the speed of the aircraft wheels. A brake control unit may determine that the axle reference speed for each axle of the landing gears is above an on ground threshold speed, and the brake control unit may allow braking to be applied.

19 Claims, 6 Drawing Sheets

SYSTEM AND METHOD FOR DETECTING AN ON GROUND CONDITION OF AN AIRCRAFT

FIELD

The present disclosure relates to brake control systems, and more particularly, to detecting an on ground condition for aircraft brake control systems.

BACKGROUND

Aircraft landing gears are typically equipped with brakes in order to stop an aircraft after landing. Applying the brakes before the wheels have accelerated to a sufficient velocity after touchdown may cause the wheels to lock and can cause damage to the wheels and aircraft. Aircraft may have systems that prevent braking until detecting that the aircraft is on the ground. For example, a weight on wheel ("WOW") system may detect a weight on the landing gear and determine that the aircraft is on the ground. Additionally, a brake control unit may calculate an aircraft reference speed using wheel speed sensors. In response to calculating a sufficient aircraft reference speed based on an average of the wheel speed sensors, the brake control unit may determine that the aircraft is on the ground and that the wheels have accelerated to a sufficient velocity to allow braking to occur safely.

SUMMARY

Methods for determining an on ground condition of an aircraft are disclosed. In various embodiments, a method may include calculating a first axle reference speed for a first landing gear of an aircraft. The method may include calculating a second axle reference speed for a second landing gear of the aircraft. In response to both the first axle reference speed and the second axle reference speed being greater than an on ground threshold, a braking force may be permitted to be applied and/or commanded to be applied to at least one of the first landing gear and the second landing gear.

In various embodiments, a method may include determining that an aircraft is on ground using a weight on wheel system. The weight on wheel system may include a time limit for determining that a braking force may be permitted to be applied and/or commanded to be applied to the aircraft. In response to determining that an elapsed time is less than the weight on wheel time limit, the method may include determining that a first axle reference speed is greater than the on ground threshold, and determining that a second axle reference speed is greater than the on ground threshold. In response to determining that the first axle reference speed and the second axle reference speed are greater than the on ground threshold, a braking force may be permitted to be applied and/or commanded to be applied to the aircraft regardless of the weight on wheel elapsed time. In response to determining that the elapsed time is greater than the weight on wheel time limit, a braking force may be permitted to be applied and/or commanded to be applied to the aircraft regardless of the axle reference speeds.

In various embodiments, a system for detecting an on ground condition of an aircraft is disclosed. The system may include one or more wheel speed sensors coupled to a first landing gear. The system may include one or more wheel speed sensors coupled to a second landing gear. The system may also include a brake control unit. The brake control unit may perform operations including calculating a first axle reference speed for the first landing gear. The brake control unit may calculate a second axle reference speed for the second landing gear. The brake control unit may determine that the aircraft is in an on ground condition in response to the first axle reference speed and the second axle reference speed being greater than an on ground threshold.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods for detecting an on ground condition for an aircraft are disclosed. A weight on wheel ("WOW") system may detect a weight on the landing gear of an aircraft and determine that the aircraft is on the ground. Additionally, an axle reference speed may be calculated for a plurality of axles. In response to determining that the axle reference speeds are greater than a minimum reference speed for each of the plurality of axles, a brake control unit may allow braking to be applied to the wheels. In response to a set time elapsing after the WOW has determined that the aircraft is on the ground, the brake control system may allow braking regardless of the calculated reference speeds.

Figure 1:
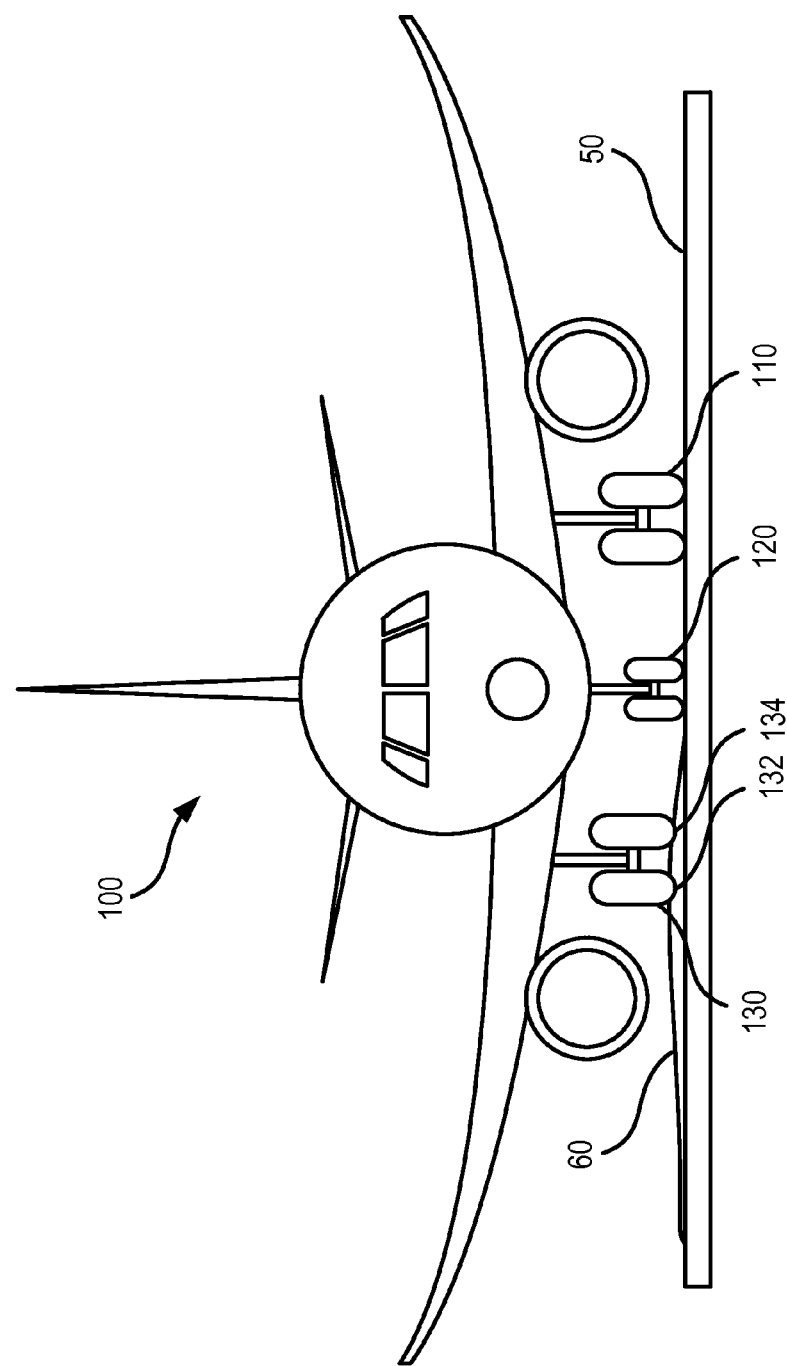
FIG. 1 illustrates, in accordance with various embodiments, a front view of an aircraft on a contaminated runway.

Referring to FIG. 1, a front view of an aircraft 100 on a runway 50 is illustrated according to various embodiments. Aircraft 100 may comprise landing gear including left main landing gear ("LMLG") 110, nose landing gear ("NLG") 120, and right main landing gear ("RMLG") 130. Each gear may comprise two wheels. For example, RMLG 130 comprises right outboard wheel 132 and right inboard wheel 134. However, in various embodiments, aircraft 100 may comprise any number of gears, and each gear may comprise any number of wheels. For example, a bogie type landing gear may comprise two or more axles with two wheels per axle. The bogie type landing gear may comprise a fore axle with an inboard wheel and an outboard wheel, and an aft axle with an inboard wheel and an outboard wheel for one or more gear.

Aircraft 100 is illustrated during spin up shortly after landing on runway 50. Spin up refers to the portion of landing during which friction between the landing surface and the wheels causes the wheels to accelerate. Runway 50 may comprise contaminant 60. Contaminant 60 may comprise any substance which causes an aircraft wheel and/or aircraft tire to at least partially slip on contaminant 60. For example, in various embodiments, contaminant 60 may comprise ice, snow, water, jet fuel, oil, diesel fuel, and/or a degraded runway surface due to potholes or other non-uniformities. In various embodiments, contaminant 60 may be a relatively slick portion of the pavement of runway 50 itself. In that regard, contaminant 60 may comprise any portion of runway 50 that has a different coefficient of friction than another portion of runway 50.

Figure 2:
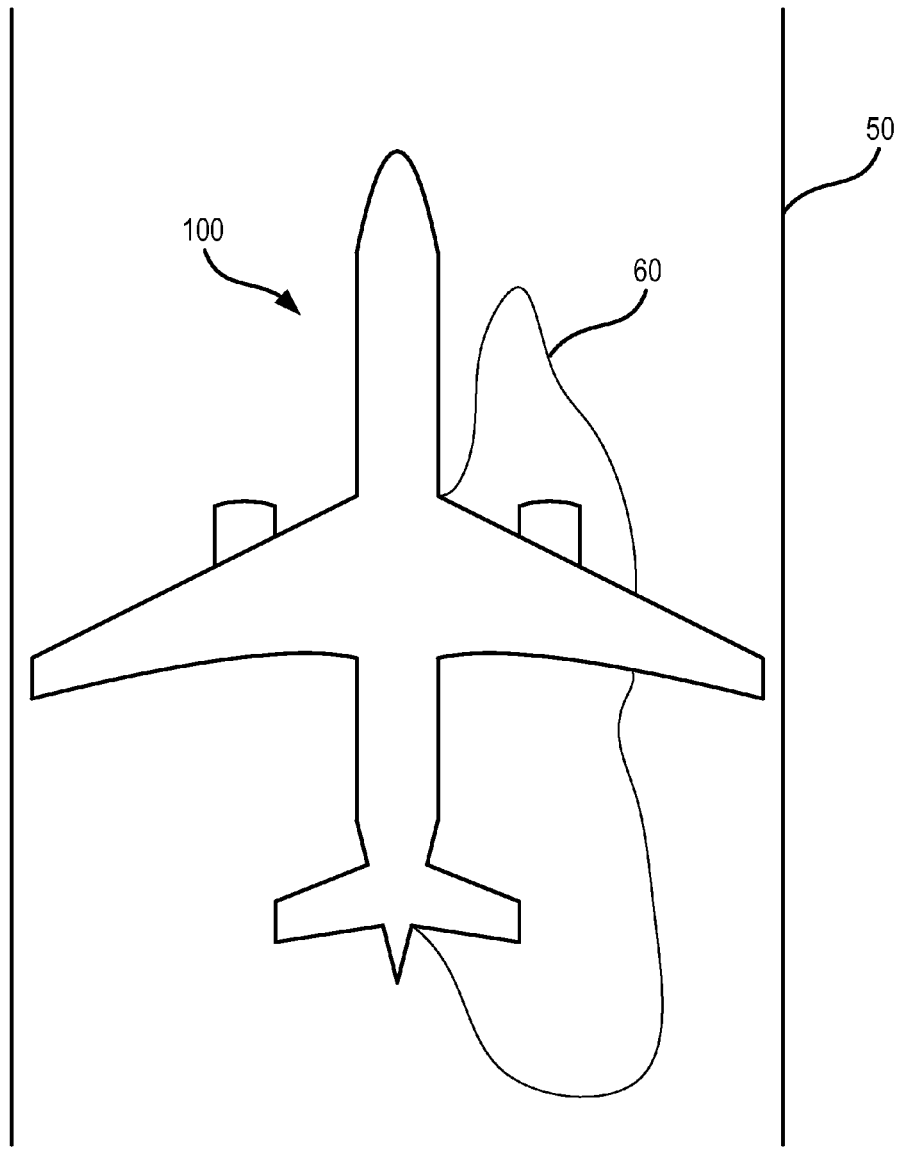
FIG. 2 illustrates, in accordance with various embodiments, a top view of an aircraft on a contaminated runway.

Referring to FIG. 2, a top view of aircraft 100 on runway 50 is illustrated according to various embodiments. As illustrated, contaminant 60 covers a portion of runway 50. Thus, in various embodiments, one or more aircraft wheels may be in contact with contaminant 60, while one or more aircraft wheels may be in contact with the pavement of runway 50. Different coefficients of friction of runway 50 and contaminant 60 may cause the aircraft wheels to spin up at varying rates. In various embodiments, LMLG 110 may spin up faster than RMLG 130 due to a higher coefficient of friction for runway 50 than for contaminant 60. In various embodiments, runway 50 may comprise multiple contaminants, such as ice and snow, each with a different coefficient of friction.

Figure 3:
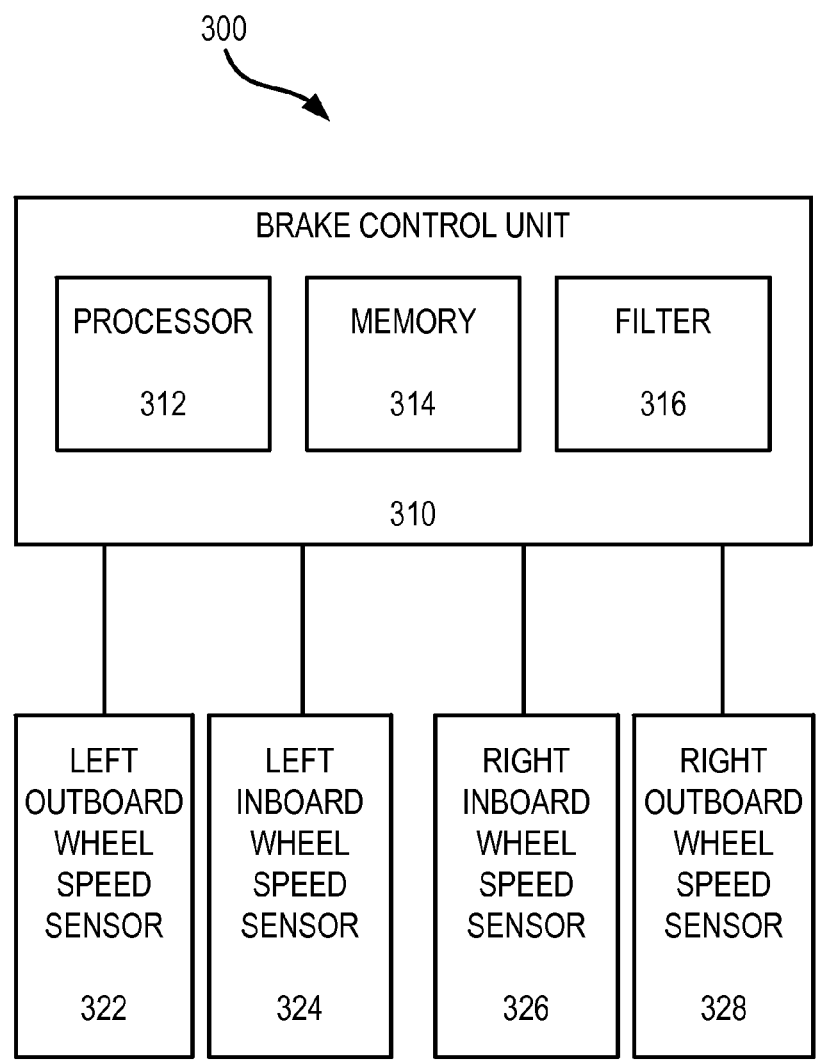
FIG. 3 illustrates, in accordance with various embodiments, a block diagram of a portion of a brake control system.

Referring to FIG. 3, a system 300 for detecting on ground conditions is illustrated according to various embodiments. System 300 may comprise brake control unit ("BCU") 310, left outboard wheel speed sensor 322, left inboard wheel speed sensor 324, right inboard wheel speed sensor 326, and right outboard wheel speed sensor 328. In various embodiments, LMLG 110 and RMLG 130 may each comprise four or more wheels, and a wheel speed sensor may be coupled to each wheel of LMLG 110 and RMLG 130. For example, LMLG 110 may comprise a fore axle comprising a wheel speed sensor coupled to each of an inboard wheel and an outboard wheel, and an aft axle comprising a wheel speed sensor coupled to each of an inboard wheel and an outboard wheel. The various components may be electrically coupled. In various embodiments, the various components may communicate via wireless communications. For example, the wheel speed sensors may wirelessly transmit wheel speed measurements to BCU 310.

Brake control unit 310 may comprise a computing device (e.g., processor 312) and an associated memory 314. The memory 314 may comprise an article of manufacture including a tangible, non-transitory computer-readable storage medium having instructions stored thereon that, in response to execution by a computing device (e.g., processor 312), cause the computing device to perform various methods.

Filter 316 may be configured to filter data received from the wheel speed sensors. In various embodiments, filter 316 may comprise a low pass filter to reduce or eliminate any high frequency noise. Filter 316 may further comprise a gear walk filter which may filter out vibrations in a specific narrow frequency range due to fore and aft oscillations of the landing gear. The frequency range may vary based on the aircraft structure. Generally, the frequency range may be higher for small aircraft and lower for large aircraft.

The wheel speed sensors may measure a raw wheel speed. The wheel speed sensors may comprise any device capable of measuring a raw wheel speed. For example, in various embodiments, the wheel speed sensors may comprise electromagnetic transducers or fiber optic transducers. In various embodiments, the wheel speed sensors may comprise an AC sensor which uses a magnet surrounded by a pickup coil in an axle of the landing gear. In various embodiments, the wheel speed sensors may comprise a DC sensor which may comprise a permanent magnet direct current generator, which outputs a voltage proportional to a rotational speed of its armature. Additionally, the wheel speed sensors may detect a change in a rate of deceleration of the wheels and may transmit a signal to BCU 310, which may determine whether braking pressure should be altered in order to assist in antiskid braking.

The raw wheel speed is the actual measured speed of the wheel. In various embodiments, each wheel on aircraft 100 may be equipped with a wheel speed sensor. However, in various embodiments, aircraft 100 may comprise one wheel speed sensor per axle pair, one wheel speed sensor per gear, or may only comprise wheel speed sensors on the main landing gears. The wheel speed sensors may transmit the raw wheel speed data to BCU 310. BCU 310 may calculate a reference wheel speed for each wheel. The reference wheel speed may be the over ground speed that the wheel would be travelling if the wheel were rolling without slipping. For example, if the wheel speed sensor measures a raw wheel speed of 10 radians per second for a wheel with a radius of 0.5 meters, BCU 310 may calculate a reference wheel speed of 5 meters per second. During spin up and subsequent braking, wheels may be at least partially slipping. Thus, the wheel reference speed may be less than the actual speed of aircraft 100 during spin up and braking.

Figure 4:
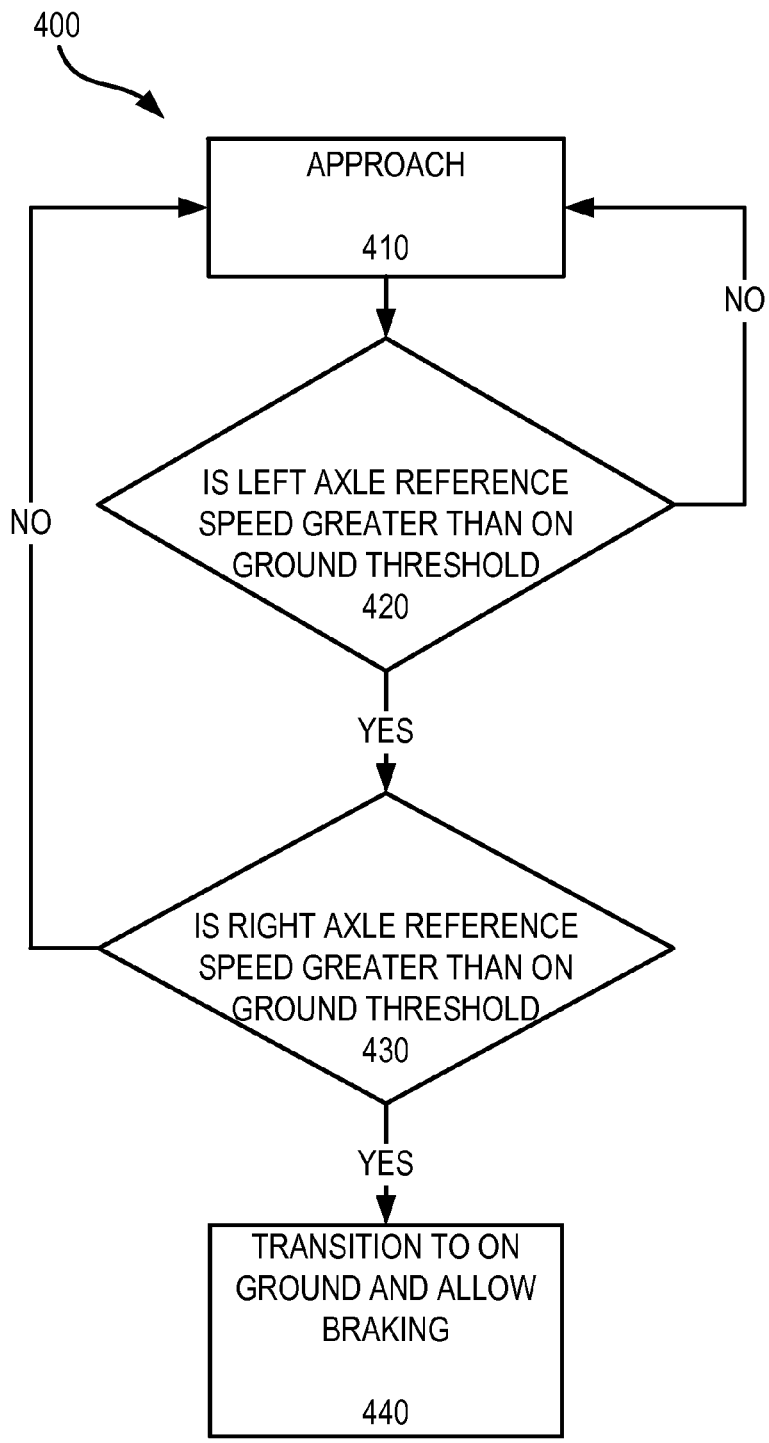
FIG. 4 illustrates, in accordance with various embodiments, a method for determining on ground conditions using axle reference speeds.

Referring to FIG. 4, a process 400 for detecting an on ground condition is illustrated according to various embodiments. As aircraft 100 prepares for landing, BCU 310 may be in approach mode (Step 410). In approach mode, BCU 310 may prevent wheel braking in order to prevent damage to the wheels and/or aircraft 100 at touchdown. BCU 310 may prevent wheel braking until a reference speed of each axle of LMLG 110 and a reference speed of each axle of RMLG 130 are each above an on ground threshold. In various embodiments, where LMLG 110 and RMLG 130 comprise multiple axle pairs, BCU 310 may prevent wheel braking until a reference speed of each axle pair of LMLG 10 and RMLG 130 is above the on ground threshold. The value for the on ground threshold ("OGT") may vary based on aircraft and wheel specifications. For example, in various embodiments, OGT may be from about 10 meters per second ("m/s") to about 50 m/s, from about 15 m/s to about 40 m/s, and from about 20 m/s to about 30 m/s, where the term "about" in this context may refer to +/−1 m/s. In response to the reference speed of each axle of LMLG 110 and the reference speed of each axle of RMLG 130 being above the OGT, antiskid braking may be utilized if appropriate to decelerate aircraft 100. In various embodiments, OGT may also comprise an acceleration threshold component. BCU 310 may calculate an axle reference acceleration for each axle, and BCU 310 may prevent braking until the axle reference acceleration for each axle is below an acceleration threshold. During spin up, the axles may be accelerating. The acceleration may decrease as the axles approach the end of spin up. In response to calculating an axle reference acceleration below the acceleration threshold, BCU 310 may allow braking to be applied. In various embodiments, the acceleration threshold may be zero or near zero, such as 0.1 m/s/s, or 1 m/s/s. In various embodiments, the acceleration threshold may be measured in angular acceleration.

BCU 310 may determine whether a left axle reference speed ("ARS") is greater than the OGT (Step 420). Left outboard wheel speed sensor 322 and left inboard wheel speed sensor 324 may transmit raw wheel speed data to BCU 310. Filter 316 may filter the raw wheel speed data to decrease noise in the data. BCU 310 may calculate wheel reference speeds for the left outboard wheel and the left inboard wheel using the filtered wheel speed data. BCU 310 may calculate a left ARS as a function of the reference speeds for the left outboard wheel 132 and the left inboard wheel 134. For example, in various embodiments, BCU 310 may average the reference speeds for the left outboard wheel 132 and the left inboard wheel 134 in order to obtain the left ARS. In various embodiments, BCU 310 may calculate a left fore ARS and a left rear ARS. In various embodiments, the function may comprise a weighted average of the reference speeds of the left outboard wheel 132 and the left inboard wheel 134. In various embodiments, LMLG 110 may only comprise a single wheel, and the left ARS may be the same as the reference speed for the single wheel. Similarly a right ARS may be calculated based on data from right inboard wheel speed sensor 326 and right outboard wheel speed sensor 328.

In response to calculating a left ARS that is less than the OGT, BCU 310 may continue to prevent braking and remain in approach condition. In response to determining that the left ARS is greater than the OGT, BCU 310 may determine whether a right ARS is greater than the OGT (Step 430). In various embodiments, BCU 310 may require that a left fore ARS and a left aft ARS are greater than the OGT prior to determining whether a right ARS is greater than the OGT. In various embodiments, the right ARS may be calculated prior to the left ARS, or in various embodiments, the left ARS and the right ARS may be calculated simultaneously. In various embodiments, the left ARS and the right ARS may be continuously calculated while aircraft 100 is in approach mode. BCU 310 may require reference speeds for the axles of both LMLG 110 and RMLG 130 to be above the OGT prior to braking in order to prevent wheels which have not fully spun up from locking due to premature braking. For example, referring back to FIG. 1, the wheels on RMLG 130 may be slipping on contaminant 60. Thus, the axles of LMLG 110 may reach the OGT prior to the axles of RMLG 130. In various embodiments, BCU 310 prevents braking until the axles of both LMLG 110 and RMLG 130 reach the OGT, even though an average of the left ARS and the right ARS may be above the OGT. In various embodiments, BCU 310 prevents braking until determining that each wheel of the main landing gears of aircraft 100 has reached the OGT.

In response to both the left ARS and the right ARS being greater than the OGT, BCU 310 may transition to the on ground condition and allow wheel braking to occur (Step 440). At this point BCU 310 may allow braking input from the cockpit to be applied to the brakes, and aircraft 100 may be safely stopped. In various embodiments, aircraft 100 may comprise three or more main landing gears. BCU 310 may require that a reference speed for the axles of each landing gear of aircraft 100 be greater than the OGT prior to transitioning to the on ground condition.

Figure 5:
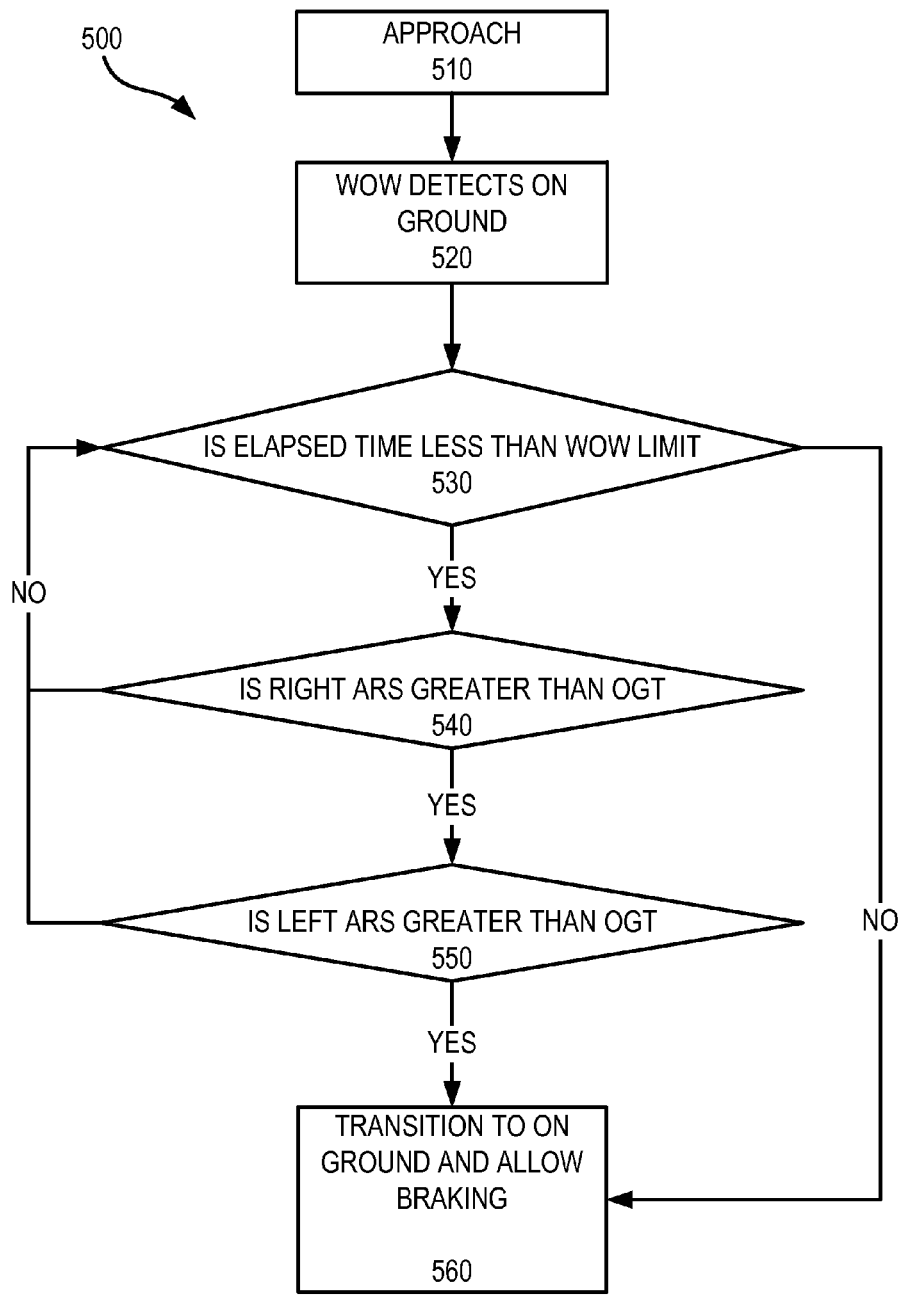
FIG. 5 illustrates, in accordance with various embodiments, a method for determining on ground conditions using axle reference speeds and a weight on wheel system.

Referring to FIG. 5, a process 500 for detecting an on ground condition using reference speeds and weight on wheel ("WOW") systems is illustrated according to various embodiments. As aircraft 100 prepares for landing, BCU 310 may be in approach mode (Step 510). In approach mode, BCU 310 may prevent wheel braking in order to prevent damage to the wheels and/or aircraft 100 from the wheels locking. In response to the landing gear making contact with the ground, the WOW system may determine that aircraft 100 is on the ground (Step 520). The WOW system may detect a pressure between the landing gear and the aircraft body due to the gravitational force applying the weight of aircraft 100 on the landing gear. In various embodiments, the WOW system may comprise proximity sensors that detect a compression of the landing gear.

In various embodiments, BCU 310 may comprise a WOW time limit which may begin at the point that the WOW system determines that aircraft 100 is on the ground. In response to the time limit expiring, BCU 310 may allow braking regardless of whether the wheels have sufficiently spun up. Thus, even if one or more ARS's have not reached the OGT, BCU 310 may allow braking after a set period of time, as possibly damaging the wheels may be preferable to not stopping aircraft 100 at all. The WOW time limit may vary for different aircraft and runways, however, in various embodiments, the WOW time limit may be between from about 2 s to 15 s, from about 3 s to about 12 s and from about 5 s to about 10 s, where the term "about" in this context may refer to 1 s. In various embodiments, the WOW time limit may be fixed. However, in various embodiments, in response to determining that the wheels have spun up within a certain percentage of OGT, such as 90% or 60%, BCU 310 may extend the WOW time limit in order to allow for the wheels to reach OGT.

BCU 310 may determine whether an elapsed time is less that the WOW time limit (Step 530). The elapsed time may refer to the difference in time between the WOW on ground detection and the determining being performed by BCU 310. In response to the elapsed time being greater than the WOW time limit, BCU 310 may transition to on ground condition and allow braking. However, in response to the elapsed time being less than the WOW time limit, BCU may determine whether the left ARS and the right ARS have reached OGT (Steps 540, 550), as previously described with reference to FIG. 4 in steps 420 and 430. In response to both the left ARS and the right ARS being greater than the OGT, BCU 310 may transition to on ground condition and allow braking (Step 560).

Figure 6:
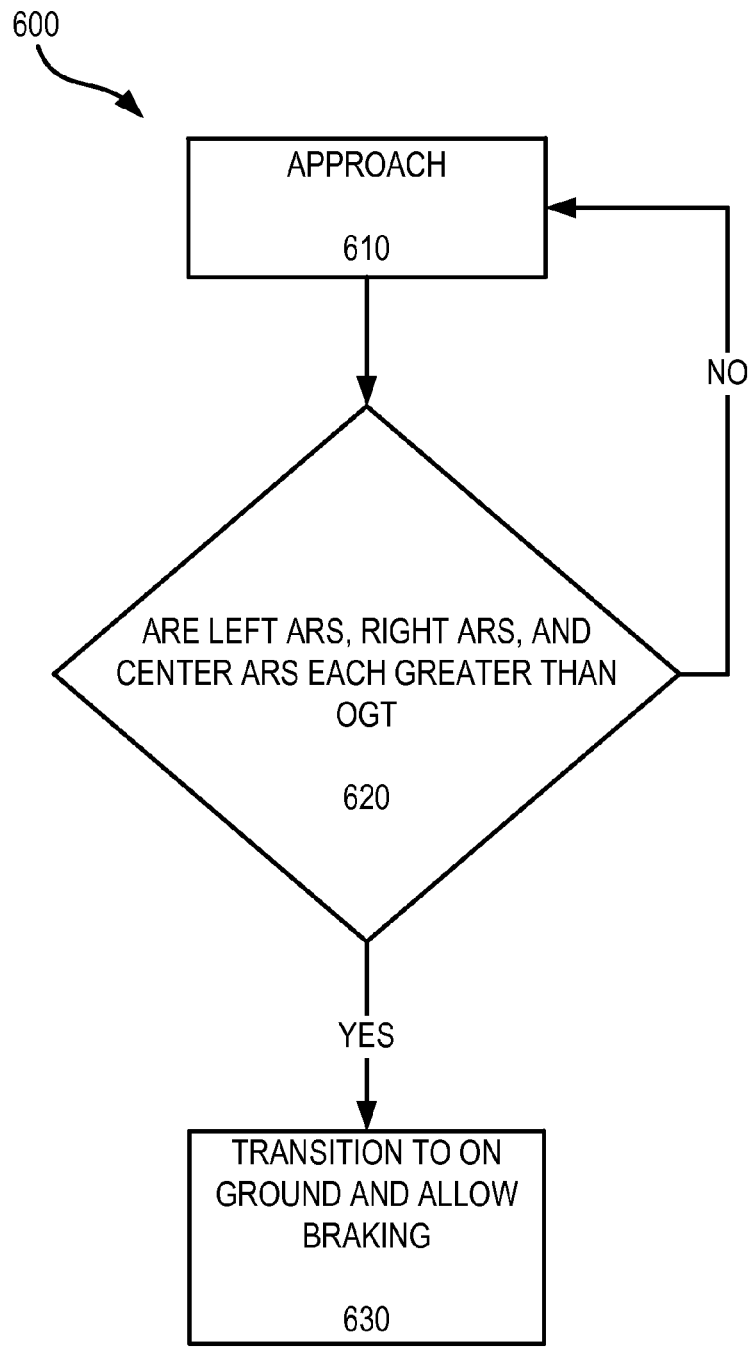
FIG. 6 illustrates, in accordance with various embodiments, a method for determining on ground conditions using three axle reference speeds.

Referring to FIG. 6, a process 600 for detecting an on ground condition of an aircraft using three axle reference speeds is illustrated according to various embodiments. As aircraft 100 prepares for landing, BCU 310 may be in approach mode (Step 610). In approach mode, BCU 310 may prevent wheel braking in order to prevent damage to the wheels and/or aircraft 100 at touchdown. BCU 310 may prevent wheel braking until a reference speed of the axles of LMLG 110, a reference speed of the axles of RMLG 130, and a reference speed of the axles of a third landing gear are each above an on ground threshold. In various embodiments, the third landing gear may be a center main landing gear. BCU 310 may determine whether a left axle reference speed ("ARS"), a right ARS, and a center ARS are each greater than the OGT (Step 620). In response to the left ARS, the right ARS, and the center ARS each being greater than the OGT, BCU 310 may transition to on ground condition and allow braking (Step 630).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for determining an on ground condition of an aircraft comprising:
    calculating a first axle reference speed for a first landing gear of an aircraft;
    calculating a second axle reference speed for a second landing gear of the aircraft; and
    in response to both the first axle reference speed and the second axle reference speed being greater than an on ground threshold, permitting, by a brake control unit, a braking force to be applied to at least one of the first landing gear and the second landing gear.

2. The method of claim 1, wherein the calculating the first axle reference speed comprises measuring a wheel speed of a wheel on the first landing gear.

3. The method of claim 1, further comprising determining that an axle reference acceleration is below an acceleration threshold.

4. The method of claim 2, further comprising transmitting the first wheel speed from a wheel speed sensor to the brake control unit.

5. The method of claim 1, further comprising calculating a third axle reference speed for a third landing gear of the aircraft.

6. The method of claim 1, wherein the calculating the first axle reference speed comprises averaging a wheel reference speed of a plurality of wheels on the first landing gear.

7. The method of claim 1, further comprising determining, using a weight on wheel system, that the aircraft is on the ground.

8. The method of claim 1, further comprising:
    measuring, using a wheel speed sensor coupled to an outboard wheel on the first landing gear, a raw outboard wheel speed of the outboard wheel;
    measuring, using a wheel speed sensor coupled to an inboard wheel on the first landing gear, a raw inboard wheel speed of the inboard wheel;
    filtering the raw outboard wheel speed and the raw inboard wheel speed to obtain filtered wheel speeds;
    calculating, based on the filtered wheel speeds, an outboard reference speed of the outboard wheel and an inboard reference speed of the inboard wheel; and
    averaging the outboard reference speed and the inboard reference speed in order to calculate the first axle reference speed.

9. A braking method comprising:
    receiving, by a brake control unit and from a weight on wheel system, a determination that an aircraft is on ground;
    in response to determining that an elapsed time is less than a weight on wheel time limit performing a method comprising:
        determining that a first axle reference speed is greater than an on ground threshold;
        determining that a second axle reference speed is greater than the on ground threshold; and
        in response to the determining that the first axle reference speed and the second axle reference speed are greater than the on ground threshold, permitting, by the brake control unit, a braking force to be applied to a wheel of the aircraft; and
    in response to determining that the elapsed time is greater than the weight on wheel time limit, permitting, by the brake control unit, the braking force to be applied to the wheel of the aircraft.

10. The method of claim 9, further comprising determining that a third axle reference speed is greater than the on ground threshold.

11. The method of claim 9, wherein the on ground threshold is a speed that allows antiskid braking to be utilized.

12. The method of claim 9, wherein the determining that the first axle reference speed is greater than the on ground threshold comprises:
    measuring, using a wheel speed sensor coupled to an outboard wheel on a left landing gear, a raw outboard wheel speed of the outboard wheel;
    measuring, using a wheel speed sensor coupled to an inboard wheel on the left landing gear, a raw inboard wheel speed of the inboard wheel;
    filtering the raw outboard wheel speed and the raw inboard wheel speed to obtain filtered wheel speeds;

calculating, based on the filtered wheel speeds, an outboard reference speed of the outboard wheel and an inboard reference speed of the inboard wheel; and averaging the outboard reference speed and the inboard reference speed in order to calculate the left axle reference speed.

13. The method of claim 12, wherein the averaging comprises calculating a weighted average.

14. The method of claim 9, further comprising preventing braking in response to at least one of the first axle reference speed and the second axle reference speed being less than the on ground threshold.

15. The method of claim 9, further comprising calculating a wheel reference speed for each wheel of the aircraft, and determining that each wheel reference speed is greater than the on ground threshold.

16. A system for detecting an on ground condition of an aircraft comprising:
- a first wheel speed sensor coupled to a first landing gear;
- a second wheel speed sensor coupled to a second landing gear; and
- a brake control unit, wherein the brake control unit performs operations comprising:
  - calculating a first axle reference speed for the first landing gear;
  - calculating a second axle reference speed for the second landing gear; and
  - determining, in response to the first axle reference speed and the second axle reference speed being greater than an on ground threshold, that the aircraft is in an on ground condition.

17. The system of claim 16, wherein the operations further comprise commanding, by the brake control unit, a braking force to be applied to at least one of the first landing gear and the second landing gear in response to the determining that the aircraft is in the on ground condition.

18. The system of claim 16, further comprising a wheel speed sensor coupled to each wheel on the first landing gear and the second landing gear.

19. The system of claim 16, wherein the brake control unit prevents braking in response to either the first axle reference speed or the second axle reference speed being less than the on ground threshold.

* * * * *